(12) United States Patent
Soghoian et al.

(10) Patent No.: US 8,713,677 B2
(45) Date of Patent: *Apr. 29, 2014

(54) ANTI-PHISHING SYSTEM AND METHOD

(75) Inventors: Christopher Soghoian, Charlottesville, VA (US); Kelly Caine, Decatur, GA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/542,609

(22) Filed: Jul. 5, 2012

(65) Prior Publication Data

US 2012/0272330 A1    Oct. 25, 2012

Related U.S. Application Data

(63) Continuation of application No. 11/500,909, filed on Aug. 9, 2006, now Pat. No. 8,220,047.

(51) Int. Cl.
    *G06F 12/16* (2006.01)

(52) U.S. Cl.
    USPC ............ 726/22; 726/23; 726/24; 726/25; 709/227; 709/206; 713/170; 713/187; 713/188; 713/189; 715/816; 715/810

(58) Field of Classification Search
    USPC .......................................................... 726/26
    See application file for complete search history.

(56) References Cited

U.S. PATENT DOCUMENTS

| | | | |
|---|---|---|---|
| 5,963,915 A * | 10/1999 | Kirsch | 705/26.8 |
| 6,175,626 B1 * | 1/2001 | Aucsmith et al. | 380/30 |
| 6,598,167 B2 * | 7/2003 | Devine et al. | 726/8 |
| 6,940,995 B2 * | 9/2005 | Choi et al. | 382/100 |
| 7,516,418 B2 | 4/2009 | Herley et al. | |
| 7,617,532 B1 | 11/2009 | Alexander et al. | |
| 7,630,987 B1 | 12/2009 | Renfro et al. | |
| 7,634,810 B2 | 12/2009 | Goodman et al. | |
| 7,665,140 B2 | 2/2010 | Oliver et al. | |
| 7,668,921 B2 | 2/2010 | Proux et al. | |
| 7,681,234 B2 | 3/2010 | Florencio et al. | |

(Continued)

OTHER PUBLICATIONS

Analysis and Improvement of Anti-Phishing Schemes; Dinei Florencio and Cormac Herley; Security and Privacy in Dynamic Environments; IFIP International Federation for Information Processing vol. 201, 2006, pp. 148-157.*

(Continued)

*Primary Examiner* — Luu Pham
*Assistant Examiner* — James Turchen
(74) *Attorney, Agent, or Firm* — Morgan, Lewis & Bockius LLP

(57) ABSTRACT

Systems and methods for anti-phishing are disclosed. At a computing device: identifying, from a user input data stream, a first set of one or more characters, and a second set of one or more characters. The first set of characters represents a portion of first private information, and the second set of characters represents a portion of second private information. In accordance with a determination that the first set of characters and second set of characters are identified in accordance with a predefined sequential relationship, taking a protective action, prior to transmitting at least a subset of the characters of the first or second private information to a server remotely located from the computing device, to protect the first or second private information. In some implementations, the first private information includes a username, and the second private information includes a password corresponding to the username.

21 Claims, 7 Drawing Sheets

(56) References Cited

U.S. PATENT DOCUMENTS

| | | |
|---|---|---|
| 7,725,585 B2 | 5/2010 | Parkinson |
| 7,757,088 B2 * | 7/2010 | Abdulhayoglu ............... 713/175 |
| 7,849,305 B2 * | 12/2010 | Leoutsarakos ................ 713/153 |
| 8,091,118 B2 | 1/2012 | Huang et al. |
| 8,127,360 B1 | 2/2012 | Wilhelm et al. |
| 2003/0128101 A1 | 7/2003 | Long |
| 2005/0058291 A1 | 3/2005 | Candelore |
| 2006/0053293 A1 * | 3/2006 | Zager et al. ................... 713/176 |
| 2006/0070126 A1 | 3/2006 | Grynberg |
| 2006/0090073 A1 * | 4/2006 | Steinberg et al. ............. 713/170 |
| 2006/0174119 A1 | 8/2006 | Xu |
| 2006/0265340 A1 | 11/2006 | Ziv et al. |
| 2007/0005984 A1 | 1/2007 | Florencio et al. |
| 2007/0006305 A1 | 1/2007 | Florencio et al. |
| 2007/0094491 A1 | 4/2007 | Teo et al. |
| 2007/0101423 A1 | 5/2007 | Oliver et al. |
| 2007/0136806 A1 | 6/2007 | Berman |
| 2007/0199054 A1 | 8/2007 | Florencio et al. |
| 2007/0255953 A1 * | 11/2007 | Peyret ........................... 713/168 |
| 2007/0261112 A1 | 11/2007 | Todd et al. |
| 2007/0282832 A1 | 12/2007 | Herley et al. |
| 2008/0046738 A1 | 2/2008 | Galloway et al. |
| 2008/0133517 A1 | 6/2008 | Kapoor et al. |
| 2008/0172741 A1 | 7/2008 | Reumann et al. |
| 2010/0299731 A1 | 11/2010 | Atkinson |
| 2011/0219035 A1 | 9/2011 | Korsunsky et al. |

OTHER PUBLICATIONS

Password Rescue: A New Approach to Phishing Prevention; Dinei Florencio and Cormac Herley; Jul. 7, 2006; HotSec '06: 1st USENIX Workshop on Hot Topics in Security.*

Florencio, Password Rescue: A New Approach to Phishing Prevention, Jul. 7, 2006, 7 pgs.

Todd, Network Security Device, U.S. Appl. No. 60/798,339, filed May 8, 2006, 43 pgs.

Wang, Light Weight Anti-Phishing With User Whitelisting in a Web Browser, 2008, 4 pgs.

Wang, Y., et al., "Light Weight Anti-Phishing with User Whitelisting in a Web Browser," IEEE Region 5 Conference, 2008, pp. 1-4.

Todd, J., et al., "Network Security Device," U.S. Appl. No. 60/798,339, filed May 8, 2006, pp. 1-27 and the pertinent drawings (drawings 1-16).

Florencio et al., "Password Rescue: A New Approach to Phishing Prevention," Microsoft Research, Jul. 7, 2006, 7 pages.

* cited by examiner

200

FROM: Trustedwebsite.com@imposter.com

Dear Trustedwebsite.com user:

You have been randomly selected to receive a prize for being a valued Trustedwebsite.com user. Please click on the below link to verify your account and to redeem your prize.

http://www.trustedwebsite.com@imposterwebsite.com

ANTI-PHISHING SYSTEM AND METHOD

RELATED APPLICATION

This application is a continuation of, and claims priority to U.S. patent application Ser. No. 11/500,909, filed on Aug. 9, 2006, entitled "Anti-Phishing System and Method," now U.S. Pat. No. 8,220,047, which is incorporated herein by reference in its entirety.

FIELD OF THE INVENTION

This invention relates to protection of personal data against phishing techniques that aim to deceptively obtain personal data from a computer user.

BACKGROUND OF THE INVENTION

In computing environments, phishing is a criminal activity where phishers attempt to fraudulently acquire private information, such as passwords, usernames, credit card details, etc., from a computer user. The term "phishing" refers to the use of electronic "lures" to "fish" for a user's private data, such as through the use of the Internet, email, or an instant message. A phisher typically disguises a communication to appear to be from a trusted person, entity, or business and entices the user to disclose private data. Phishing is an increasing problem, and has prompted legislation, user training, and technical anti-phishing solutions to protect users. Existing anti-phishing solutions typically involve constant manual updating, which lags behind phishers' ability to generate new lures, or rely on a user's ability to recognize valid communications.

SUMMARY OF THE INVENTION

These and other drawbacks are overcome through various embodiments of the present invention.

Accordingly, various embodiments of the present invention may be directed to an anti-phishing system and method.

In some implementations, an anti-phishing method includes, at a computing device having one or more processors, identifying, from a user input data stream, a first set of one or more characters, and a second set of one or more characters. The first set of one or more characters represents a portion of first private information, and the second set of one or more characters represents a portion of second private information. The method further includes, in accordance with a determination that the first set of characters and second set of characters are identified in accordance with a predefined sequential relationship, taking a protective action, prior to transmitting at least a subset of the characters of the first or second private information to a server remotely located from the computing device, to protect the first or second private information. In some implementations, the first private information includes a username, and the second private information includes a password corresponding to the username. In some implementations, the sequential relationship includes a predefined maximum number of characters between the first set of characters representing the first private information, and the second set of characters representing the second private information.

BRIEF DESCRIPTION OF THE DRAWINGS

FIGS. 2A-B illustrate an exemplary embodiment of one or more phishing communications, in accordance with various embodiments of the invention;

DETAILED DESCRIPTION OF EXEMPLARY EMBODIMENTS

Figure 1:
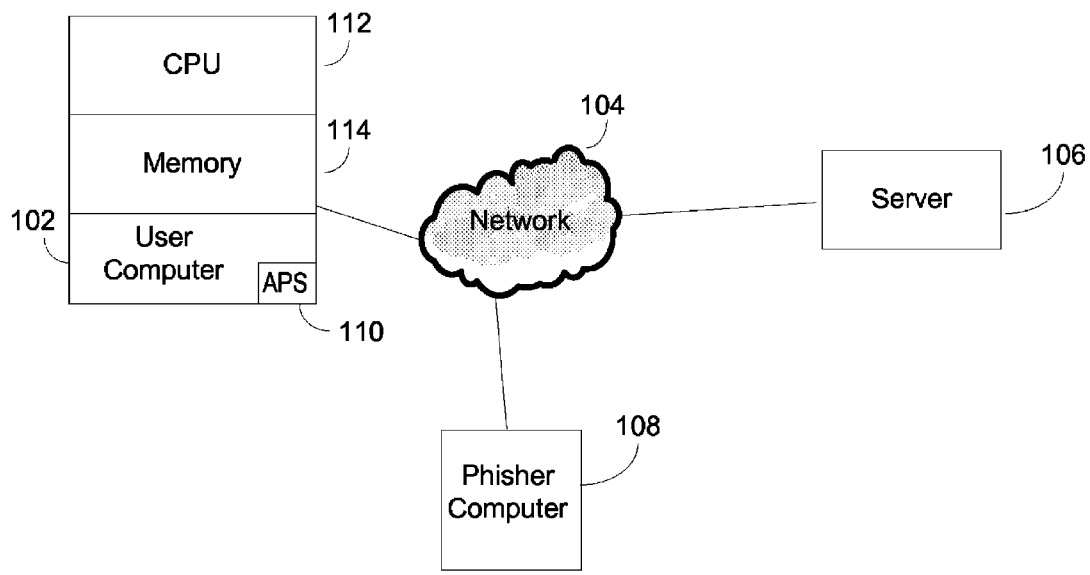
FIG. 1 illustrates an exemplary embodiment of a computer network, in accordance with various embodiments of the invention.

The embodiments described herein address many problems with existing systems and methods. The following description is intended to convey a thorough understanding of the embodiments described herein by providing a number of specific embodiments and details involving systems and methods for implementing anti-phishing based solutions. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a server" includes a plurality of such servers, as well as a single server, and equivalents thereof known to those skilled in the art, and so forth.

Unless defined otherwise, all technical and scientific terms used herein have the same meanings as commonly understood by one of ordinary skill in the art to which this invention belongs.

The anti-phishing system and method may be implemented at a user computer to evaluate an electronic document (e.g., a webpage) served to the user computer by a server. As used herein, the term "electronic document" should be understood to include a webpage of a website, an email, an instant message, or other types of document capable of rendering an image or text to a user (e.g., any document capable of rendering HTML code or XML code).

The anti-phishing system and method may include one or more modules, including one or more remote modules. As used herein, the term "module" may be understood to refer to a piece of software, firmware, and/or hardware that renders data for use in processing an electronic document. Modules may be personalized to user preferences, preferences of the electronic document, preferences of the environment, and/or other inputs.

Various exemplary embodiments provide an improved anti-phishing solution. From the user's perspective, an improved anti-phishing solution may involve allowing a computer system to determine whether an electronic document may be trusted, rather than requiring a user to be vigilant in determining whether an untrusted electronic document is phishing for their private information. According to various embodiments, one or more modules may detect when the user is potentially being phished by an untrusted electronic document and then may take appropriate action, including warning the user before they have submitted their private information to a server associated with the untrusted electronic document. Various modules according to exemplary embodiments may recognize a potential phishing event based on the information the user is attempting to submit in an untrusted communication (e.g., to an untrusted website, to an untrusted email recipient, etc.).

Overview of an Exemplary System

FIG. 1 illustrates an exemplary embodiment of a system 100 implementing an anti-phishing system (APS) 110. The system 100 may include a user computer 102, a network 104, a server 106, and a phisher computer 108. The user computer 102 and the phisher computer 108 may be any device capable of executing one or more lines of computer code, such as, but not limited to, a desktop computer, a laptop computer, a notebook computer, a mobile phone, a personal digital assistant (PDA), combinations thereof, or other suitable computing devices. In an exemplary embodiment, the server 106 may be a server capable of serving electronic documents (e.g., webpages) to the user computer 102 over the network 104.

The user computer 102 may include an APS 110 for identifying and preventing a phishing attack. In other exemplary embodiments, some or all of the APS 110 may be implemented at the server 106. Some or all of the functions of the APS 110 may be implemented in software, hardware, and/or firmware. In an exemplary embodiment, the APS 110 may be software associated with a communication tool module, such as, but not limited to, a web browser, stored on the user computer 102 to monitor the electronic addresses visited by the user and the data the user exchanges with the server 106. For example, the APS 110 may be a Firefox extension that warns the user before they are about to transmit potentially "sensitive" private information. The APS 110 also may be used with other browsers, such as, but not limited to, Internet Explorer and Netscape Navigator. The APS 110 may be storeable on a tangible media and may be implementable on a computing device. For example, the APS 110 may be stored on one or more of a recordable storage media, such as, but not limited to, a computer disk, on one or more computing devices, on one or more servers, combinations thereof, and/or on other devices suitable for storing software.

A phisher, using the phisher computer 108, may create an electronic document that appears to be from a trusted provider, such as, but not limited to, from a bank with which the user has an account. The phisher may transmit the electronic document to the user computer 102 in an attempt to deceive the user into thinking that the electronic document is from the trusted provider in order to obtain private information from the user. In other exemplary embodiments, the phisher may create an electronic document (e.g., a website) that the server 106 may serve to the user computer 102.

FIG. 2A illustrates an exemplary embodiment of an interface (e.g., a graphical user interface (GUI)) that may display a phishing window 200 presented to a user by an electronic document from the phisher computer 108. The phishing window 200 may be a pop-up ad, an email addressed to the user, an instant message, a website, and/or other suitable manners of displaying an electronic message to a user. The phishing window 200 may emulate various features associated with a trusted provider, and may appear similar to an electronic document of the trusted provider. For example, the electronic document may include logos and/or other information identifying a bank of the user.

To deceive the user, the phishing window 200 may include a message instructing the user to follow a link (e.g., a URL) in the electronic document to an untrusted electronic document, such as, but not limited to, an untrusted webpage, to "verify" their private information. The message may indicate that the user has won a prize, that someone else is illegally trying to access their account, or other deceptive messages in an attempt to have the user follow the link and disclose their private information. In the depicted exemplary embodiment, the phishing window 200 includes a message indicating that the user has been selected to receive a prize. The phishing window 200 instructs the user to click on a link to a website to verify their account.

Figure 2B:
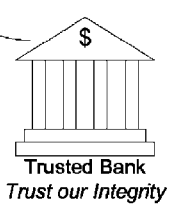

FIG. 2B illustrates an exemplary embodiment of an untrusted electronic document 202. As depicted, the untrusted electronic document 202 may request that the user enter their username and password to "verify" their account in order to redeem the prize. In effect, the message of the untrusted electronic document 202 may attempt to deceive the user into disclosing their private information. The untrusted electronic document 202 also may include a logo 204 or other information to deceive the user into believing that the untrusted electronic document 202 is actually associated with the trusted provider (e.g., www.trustedwebsite.com). In various other exemplary embodiments, the untrusted electronic document 202 may use other types of deceptive messages and may request other types of private information from the user. If the user discloses the private information in response to the untrusted electronic document 202, the phisher may then use the private information to fraudulently gain access to the user's account. For example, the phisher may use the username and password to access the user's email, an online banking account, and/or online gaming account to steal information, money, and/or other things the user values and protects with private information.

Phishing websites may all be attempting to deceive the user into disclosing the same private information, such as, but not limited to, one or more of a user name, a password, a credit card number, a credit card verification (CCV) code, account details, a user's address, a user's mother's maiden name, a user's social security number, combinations thereof, and/or other similar types of private information that a user may have. For the most part, these types of private information may not change very frequently. For example, a user's username this week may probably be the same next month. Additionally, users may tend to use the same private information at multiple websites. For example, a user's online banking password for one website may often be the same as a user's online password for another website. Conventional wisdom may believe that having a common password for multiple websites is bad for computer security, as it may mean that an attacker who learns a login and/or password for one of the user's accounts can easily access other accounts. According to exemplary embodiments, the APS 110 may take advantage of this infrequent change of private information to protect the user from phishing attacks.

Exemplary System Architecture

Figure 3:
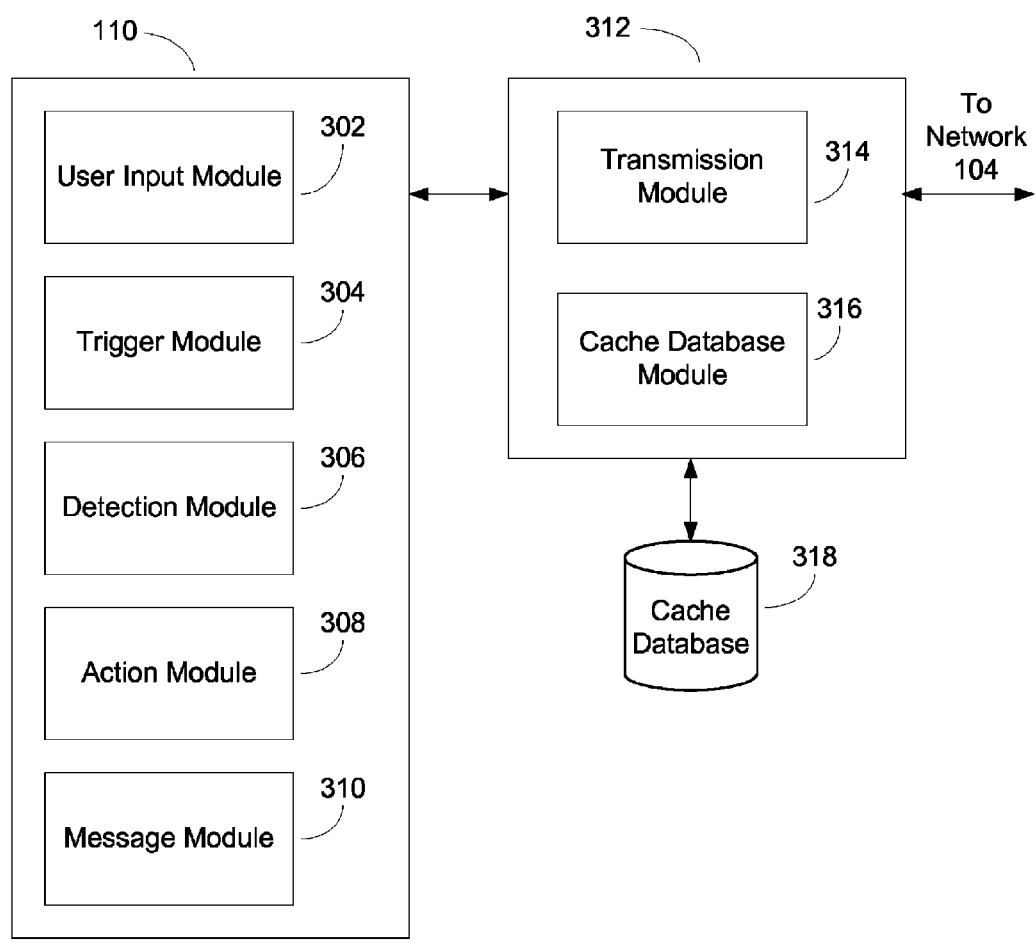
FIG. 3 illustrates an exemplary embodiment of a user computer including an anti-phishing system, in accordance with various embodiments of the invention.

FIG. 3 illustrates an exemplary embodiment of a user computer 102 including an APS 110, a communication tool module 312, and a cache database 318. The communication tool module 312 may include a transmission module 314 for receiving a user input data stream from the APS 110 and communicating the user input data stream across the network 104. In an exemplary embodiment, the communication tool module 312 may include a browser or other user interface to permit the user to communicate with various devices across the network 104.

The cache database module 316 may store, access, and retrieve private information from the cache database 318. The cache database 318 may store a user's private information such as, but not limited to, a user's user names, passwords, the domain names and/or providers with which they are associated, and/or personal information, such as, but not limited to, a home address, a pet's name, a family member's name, a social security number, combinations thereof, and other types of information a user may disclose when signing up for an account. In an exemplary embodiment, the cache database module 316 may be a password manager that stores various types of private information associated with a domain name or a computing device. For example, the cache database module 316 may store a username, a password, and a domain name in the cache database 318 corresponding to a particular website or a particular computing device. In an exemplary embodiment, the cache database module 316 may be the Firefox Password Manager, which stores the combination of username+password+domain that correspond to a particular website. Other password managers also may be used.

In an exemplary embodiment, the cache database module 316 may monitor the private information the user discloses to various providers over the network 104. For example, as a user visits a website during web browsing, the cache database module 316 may store in the cache database 318 private information entered by the user while creating an account and may associate the stored private information with the domain name of the website. In a further example, the user may enter login private information to login to a computing device across the network 104 and the cache database module 316 may store the login private information in the cache database 318 and may associate the stored login private information with the computing device.

The APS 110 may include one or more of the following modules: a user input module 302, a trigger module 304, a detection module 306, an action module 308, and a message module 310.

The user input module 302 may receive a user input data stream corresponding to user input at a keyboard and/or a mouse of the user computer 102. For example, the user may enter various sequences of numbers, letters, and/or symbols when interacting with the user computer 102. The user input module 302 may identify and may use the various sequences for communicating with the server 106.

The trigger module 304 may generate, receive, store and/or coordinate one or more trigger events. The trigger events may be based on the private information of the user and may be used to trigger when the APS 110 performs further processing to determine whether to take an action to protect the private information. Each trigger event may be used in determining whether user input data includes one or more characters of the private information.

The detection module 306 may monitor the user input data stream temporally and/or sequentially for various character sequences to identify one or more characters of the private information corresponding to the trigger events.

The action module 308 may take an action based on the detection module 306 identifying a trigger event. The action module 308 may instruct the communication tool module 312 to display a warning message, authenticate the server 106, instruct the transmission module 314 to stop transmitting the user input data stream to the server 106, and/or other actions to protect the private information.

Figure 4:
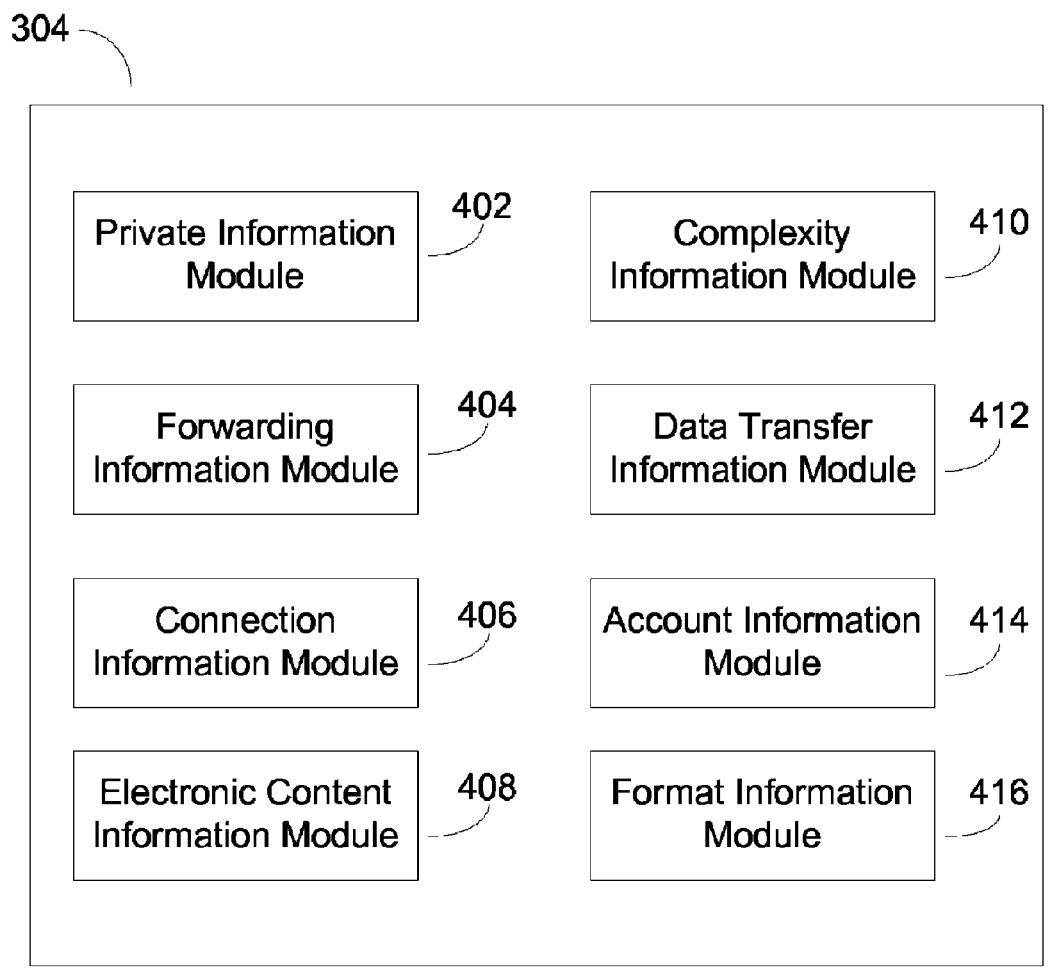
FIG. 4 illustrates an exemplary embodiment of a trigger module, in accordance with various embodiments of the invention.

FIG. 4 illustrates an exemplary embodiment of the trigger module 304. The trigger module 304 may include a private information module 402, a forwarding information module 404, a connection information module 406, an electronic content information module 408, a complexity information module 410, a data transfer information module 412, an account information module 414, and a format information module 416. The trigger module 304 may generate, receive, store and/or coordinate one or more trigger events based on the various modules 402-416. The trigger events may correspond to sequences of characters identified in the use input data stream indicating that the APS 110 may determine whether to take an action to protect the private information.

Trigger events may balance the interest of protecting the user's private information against the interest of excessively warning the user (i.e., too high of a false positive error rate). If the protection of the user's private information is too low (i.e., the APS 110 does not warn the user and/or otherwise prevent the phishing attack), then the APS 110 may not be useful to the user. On the other hand, if the protection of the user's private information is too high, then the APS 110 may generate too many messages incorrectly warning the user that the untrusted electronic document may be fraudulently attempting to obtain their private information, thereby interfering with the user's normal data communication experience. This may frustrate the user and prompt the user not to use the APS 110. The APS 110 may set the trigger events to accomplish both protecting the user's private information and minimizing the false positive error rate.

The trigger events may be based on one or more types of information that may be generated by the various modules 402-416. In an exemplary embodiment, the trigger events may be based on the private information, forwarding information, connection information, data transfer information, electronic content information, complexity information, format information, account information, alone or in combination, each of which are described in detail below corresponding to the associated module 402-416. These types of information may be used to balance protecting the user against too high of a false positive error rate.

The private information module 402 may retrieve stored private information from the cache database 318. Based on the retrieved private information, the private information module 402 may determine certain information about the user. For example, the private information module 402 may determine that a user has an account with certain providers (e.g., a bank, email providers, online gambling providers, etc.), how the user electronically accesses these providers (e.g., at their website www.trustedbank.com, logging into their server, etc.), and any types of private information stored in the cache database 318 (e.g., username, password, etc.). This may allow the private information module 402 to learn about and access the private information of the user without having the user manually input the private information. Thus, the APS 110 may protect the user's private information with only minimal input from the user. In other exemplary embodiments, the private information module 402 may prompt the user to enter the private information and the providers with which the private information is associated. One or more characters of the private information obtained by the private information module 402 may be associated with a trigger event to determine when the user may be transmitting private information in response to the untrusted electronic document.

In an exemplary embodiment, the trigger module 304 may generate a trigger event based on the private information including a username, a password, and a domain name. The trigger event may indicate that further processing may be necessary by the APS 110 to determine whether to take an action to protect the private information when one or more characters of the username, password, and/or domain name are identified in the user input data stream.

The forwarding information module 404 may generate forwarding information. The forwarding information may identify what type of electronic document directed the user to the untrusted electronic document and the content of the directing electronic document. For example, the forwarding information module 404 may indicate in the forwarding information that the electronic document directing the user to the untrusted electronic document is an email, an instant message, a pop-up ad, a search engine, combinations thereof, and/or other suitable electronic documents for directing a user to a website. The forwarding information also may indicate that the user entered an address (e.g., a URL, a network address) in an address bar of a browser and may not have been redirected by an electronic document.

The forwarding information module 404 also may indicate in the forwarding information the content of the directing electronic document. In an exemplary embodiment, the forwarding information module 404 may evaluate the code of the directing electronic document, such as, but not limited to, HTML, XML, etc., and any images presented to the user in the directing electronic document, both or other items as well, to identify if the directing electronic document is soliciting private information from the user. The forwarding information module 404 also may use optical character recognition (OCR) to identify if any images within the directing electronic document solicit private information from the user. Phishers have been known to include messages soliciting private information in images placed in electronic documents to avoid a spam filter from detecting these types of messages in the underlying browser code, even going so far as to break an image into multiple pieces to make it difficult to view unless rendered for the user. Generating a temporary output and OCRing that output of the image generated may allow the system to identify fraudulent messages included in one or more images.

The trigger module 304 may generate a trigger event based on the forwarding information. In an exemplary embodiment, the trigger event may indicate that further processing may be necessary by the APS 110 to determine whether to take an action to protect the private information when the user has been redirected from an email, instant message, a pop-up ad, etc., to a website, but may indicate that further processing is not necessary when the user has entered the address of a provider in an address bar of the communication tool module 312 or clicked on a link presented by a search engine. In other exemplary embodiments, the trigger event may indicate that processing may be necessary by the APS 110 when the content of the directing electronic document solicits the user for a username and password, but may indicate that further processing is not necessary when the electronic document does not solicit private information.

The connection information module 406 may indicate in the connection information what type of connection protocol is being used for transmitting data between the user computer 102 and the server 106. In an exemplary embodiment, the connection information module 406 may determine whether the connection protocol is a secured connection protocol, such as, but not limited to, secure socket layer (SSL), an encrypted protocol, other protocols used to protect data for transmission over the network 104, or a non-data protecting protocol. The secured connection protocol may provide end-point authentication and communications privacy over the network 104 using cryptography and other suitable data protection. The secured connection protocol may authenticate the server 106 (i.e. to ensure its identity), the user computer 102, both, or other authenticate other devices. In an exemplary embodiment, the secured connection protocol may allow the user computer 102 and the server 106 to communicate in a way designed to prevent eavesdropping, tampering, and/or message forgery. In contrast, a non-data protecting protocol may not: provide any authentication of the server 106; encrypt of the transmitted data; and/or provide protection for the transmitted data.

The trigger module 304 may generate a trigger event based on the connection information. In an exemplary embodiment, the trigger event may indicate that further processing may be necessary by the APS 110 to determine whether to take an action to protect the private information when the connection protocol does not provide any type of protection for the private information, and may indicate that further processing is not necessary when the connection protocol provides data protection.

The electronic content information module 408 may indicate in the electronic content information whether the untrusted electronic document may be soliciting private information from the user. In exemplary embodiment, the electronic content information module 408 may evaluate the content of the untrusted electronic document to determine what if untrusted electronic document is soliciting private information. For example, the electronic content information module 408 may determine whether the untrusted electronic document includes a field requesting the user enter a username and password, a credit card number, a social security number, a home address, a bank account number, etc., and/or other types of private information. To determine this, the electronic content information module 408 may evaluate either the underlying code of the untrusted electronic document, such as, but not limited to, HTML, XML, etc., any single or combinations of images presented to the user, both or other items as well, for text soliciting private information from the user. The electronic content information module 408 also may use optical character recognition (OCR) to render and to identify if the untrusted electronic document is soliciting private information within one or more images. The electronic content information module 408 also may determine if the untrusted electronic document includes any data obscuring fields, such as, but not limited to, fields that display one or more "*" characters in the field instead of the actual characters typed by the user.

The trigger module 304 may generate a trigger event based on the electronic content information. In an exemplary embodiment, the trigger event may indicate that further processing may be necessary by the APS 110 to determine whether to take an action to protect the private information before all of the characters in the private information have been entered when the untrusted electronic document is soliciting private information, and that further processing may not be necessary until all of the characters in the private information have been entered when the untrusted electronic document is not soliciting private information.

The complexity information module 410 may generate complexity information to identify the complexity of a user's private information, which may be a string of characters. The complexity information may determine what types of characters are used in the private information, and the commonness of the private information. Commonness may refer to the probability that a phisher may be able to determine all of the characters of the private information without having to receive every single character. Typically, a short dictionary word or a short sequential string of numbers may be easy to guess if the phisher is aware of several of the letters or numbers in the string (e.g., a four digit pin number may be simple to guess if the phisher knows the first three digits). Users who may not be very sophisticated may use common dictionary words as a username or as a password, and these types of unsophisticated users are more likely to fall for a phishing attack. In contrast, multi-case, alpha-numeric-symbol strings are more difficult for a phisher to guess or determine using a brute force code.

The complexity information module 410 may determine if the characters of the private information are: (1) a string of one or more letters and the case of each of the letters, which may be in one or more different languages, (2) a string of one or more numbers; (3) a string of symbols (e.g., '*,' '^,' '§,' etc.), and/or (4) a string containing a combination of letters, numbers, and/or symbols, etc. The complexity information module 410 may then rate the private information based on the characters of the private information and include the rating in the complexity information. The ratings may sort the private information into one or more levels based on the length of the private information and the characters in the private information.

The following provides a description of exemplary levels used by the complexity information module 410; however, other levels of private information also may be used. The levels may range from less complex private information to more complex private information. A first level may include the least complex private information (i.e., easiest to guess). Generally, less complex private information may be easier for a phisher to guess or determine using a brute force code. The first level may include short and common dictionary words all in lower case (e.g., "god," "money," "jesus," "and "love") and short sequential number sequences (e.g., "456"). A second level may include longer and less common dictionary words in lower case, such as, but not limited to, "extrovert," shorter multi-case common dictionary words, such as, but not limited to, "gOd," and short non-sequential number sequences (e.g., "157"). A third level may include multi-case longer common dictionary words (e.g., "eXTroveRT"), longer strings of numbers (e.g., "942340623"), and non-dictionary word letter strings (e.g., "abrscf"). A fourth level may include multi-case alpha-number-symbol character strings (e.g. "23Rxt#% x," "jEsu5"). The above levels are exemplary, fewer or greater numbers of levels may be used, and the content of the private information within each of the levels may be varied.

The trigger module 304 may generate a trigger event based on the complexity information. In an exemplary embodiment, the trigger event may be used to indicate that further processing may be necessary by the APS 110 to determine whether to take an action to protect the private information after only one or a few of the characters of the private information have been entered for complex private information, and further processing may be necessary after identifying most or all of the characters of less complex private information in combination with identifying other private information. In an exemplary embodiment for a complex password, the trigger event may be used to identify that the input data stream includes private information every time the detection module 306 identifies at least a portion of a more complex password that a user is unlikely to use in a non-login event. For example, a user with the complex password "jEsu5" likely only uses this password during a log-in event, and thus it may be likely that the user may have been deceived by a phishing attack when using one or more characters of this password.

In contrast, when a username and password are both less complex private information, then the trigger event may occur when some or all of one of the characters of a username or password is identified, and one or more characters of the other of the username or password is also identified. In an exemplary embodiment, if the private information is a username "smith" with an associated password "cat," once the user has entered either "smith," the trigger event may indicate that the user is transmitting private information if, temporally and/or sequentially near to the username in the user input data stream, the detection module 306 identifies one or more letters of the password "cat."

The data transfer module 412 may generate data transfer information that identifies whether the untrusted electronic document uses any real-time data transfer technology. In an exemplary embodiment, the data transfer module 412 may identify if the untrusted electronic document uses a real-time data transfer technology that transmits data entered by the user at the user computer 102 to the server 106 in real-time. Once such technology is Asynchronous JavaScript and XML (AJAX), which transmits data to the server 106 as the user types the data at a keyboard of the user computer 102. Real-time transfer technologies are potentially dangerous to users because the server 106 may receive the information from the user in real-time without having to wait for the user to send the information (e.g., click a "send" button). For example, if the user enters all but the final character or characters of the private information and AJAX has transmitted the characters to the server 106, the last character may, in certain instances, be easily guessed or determined by various techniques (e.g., a quick brute force search by software or human guess). In contrast, the data transfer module 412 may identify that the untrusted electronic document uses non-real-time data transfer technology, where data may only be forwarded to the server 106 after decides to submit the data. For example, the user may click "submit" field in the untrusted electronic document to transfer data to the server 106.

The trigger module 304 may generate a trigger event based on the data transfer information. In an exemplary embodiment, the trigger event may be used to indicate that further processing may be necessary by the APS 110 to determine whether to take an action to protect the private information before all of the characters in the private information have been entered when the server 106 associated with the untrusted electronic document may be using real-time data transfer technology, and that further processing may not be necessary until all of the characters in the private information have been entered when the server 106 associated with the untrusted electronic document is not using real-time data transfer technology.

The account information module 414 may retrieve account information from the cache database 318 that identifies personal information about the user typically given when one signs up for an account. For example, the account information may be one or more of a user's: name (e.g., "Christopher Jones"), home address, social security number, family member's name (e.g., mother's maiden name), pet's name, etc., combinations thereof, and/or other similar information typically given by a user when signing up for an account (e.g., a bank account). The account information may be obtained from the cache database 318, which may be populated with the account information as the user signs up for various accounts, and also may be obtained from an auto-fill-forms feature of the communications tool module 312 that automatically fills in forms based on previously entered information. The account information module 414 also may prompt the user for the account information. The account information may be indicative of a user signing up for an account and may be used to confirm the possibility that the untrusted electronic document may have misled the user into believing that the untrusted electronic document is a trusted provider, when in fact, it may not be.

The trigger module 304 may use the account information to generate a trigger event. In an exemplary embodiment, the trigger event may be used to indicate that further processing may be necessary by the APS 110 to determine whether to take an action to protect the private information before all of the characters in the private information have been entered when the user input data stream includes one or more characters of a user's social security number, and that further processing may not be necessary when the user input data stream does not include the social security number.

The format information module 416 may generate format information that may be used to generate trigger events based on the format of certain types of private information. These types of trigger events may protect the private information of a user that cache database 318 may not be permitted to store. Certain types of private information use a common format and have certain characteristics within the format that may be used to identify that they are private information, even if the APS 110 may not be aware of the private information. One such example may be credit card numbers. The APS 110 may be able to identify credit card numbers in the user input data stream based on the format of the number before the entire credit card number has been entered by the user. In an exemplary embodiment, based on the cache database 318 or a cached history of visited websites, the format information module 416 may infer that a user has a credit card associated with a particular bank, which may be used in the format information for determining when characters in the user input data stream correspond to the user's credit card number.

Credit card numbers often have a certain amount of internal structure, and share a common numbering scheme. Most credit card numbers are a special case of International Organization for Standardization (ISO) 7812 numbers. An ISO 7812 number contains a single-digit major industry identifier (MII), a six-digit issuer identifier number (IIN), an account number, and a single digit checksum. The card number's prefix is the sequence of digits at the beginning of the number that determine the credit card network to which the number belongs. The first six digits of the credit card number are known as the Bank Identification Number (BIN), which identifies the institution that issued the card to the card holder. The rest of the credit card number is allocated by the issuer, and the checksum is the last digit that is used to confirm the preceding digits of the credit card number. Additionally, many credit cards include a CCV code, which is typically several digits printed on the signature strip on the back of the card.

Based on knowledge of the ISO 7812 standard, the trigger module 304 may generate a trigger event that identifies when the user may be inputting valid a credit card number to the user computer 102. In an exemplary embodiment, the trigger event may correspond to a BIN of a bank with which the user holds an account. For example, users having accounts with one bank may have predetermined numbers assigned for the first four numbers of the credit card account number, which the trigger module 304 may set as the trigger event.

In other exemplary embodiments, the trigger module 304 may generate a trigger event corresponding to all of the digits corresponding to known credit card numbers (e.g., most credit card issuers use sixteen digits, but other numbers of digits also may be used) and the detection module 306 may use the checksum to confirm that the digits correspond to a valid credit card number, instead of a random number (e.g., a random sixteen digit number as compared with a sixteen digit credit card number).

In further exemplary embodiments, the trigger module 304 may generate trigger events based on various combinations of one or more of the private information, the forwarding information, the connection information, the data transfer information, the electronic content information, the complexity information, the format information, and the account information received from the various modules 402-416. The various combinations also may be weighted relative to one another for generating a trigger event determining when the APS should perform further processing to determine whether to take an action to protect the private information.

In an exemplary embodiment, the trigger module 304 may generate a trigger event corresponding to a home address from the account information and a low complexity username and password from the complexity information. The detection module 306 may determine that the APS 110 may conduct further processing to determine whether to take an action to protect the private information after identifying, in the user input data stream, the home address, one or more characters of the username, and/or one or more characters of the password.

In a further exemplary embodiment, the trigger module 304 may generate a trigger event when most of the characters of private information are identified in a user input data stream. For example, in the situation where the forwarding information indicates that the user has entered a URL into an address bar of the communication tool module 312, the connection information indicates that the user computer 102 is communicating with the server 106 using an encrypted secured connection protocol, the complexity information indicates that the private information is a common dictionary word password, the electronic content information indicates that the user is not being solicited by the website for private information, and the data transfer information indicates that the server 106 associated with the untrusted electronic document is not using real-time transmission technology to transmit the data input by the user as the user types on the keyboard, the trigger module 304 may set the trigger event to only determine that the user is inputting private information after the user has entered most or all of the characters associated with the private information.

In yet another exemplary embodiment, the trigger module 304 may generate a trigger event when only a few of the characters of the private information are identified in a user input data stream. For example, in the situation where the forwarding information indicates that the user has clicked on an image in an email and was redirected to a website, the electronic content information indicates that the user is being solicited for private information, the complexity information indicates that the users has a complex non-dictionary word password, and the data transfer information indicates that the website uses software that forwards every character to the server 106 in real-time, the trigger event may indicate that the user is entering private information when the user has entered only a few characters of the private information. These embodiments describing setting trigger events based on various combinations of information are exemplary, other weighted and non-weighted combinations also may be used.

Exemplary Process

Figure 5:
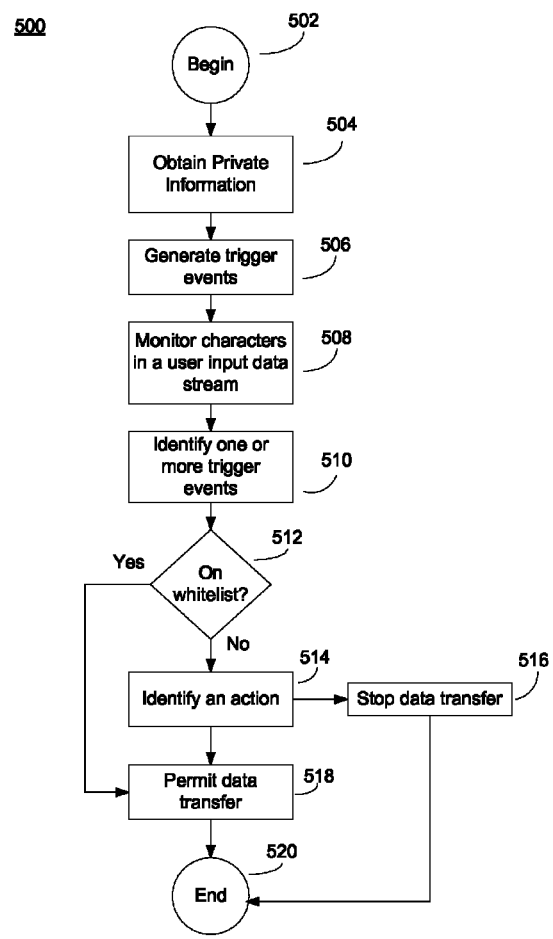
FIG. 5 illustrates an exemplary embodiment of a process implemented using an anti-phishing system, in accordance with various embodiments of the invention.

FIG. 5 illustrates a flow diagram depicting exemplary acts that may be performed. The flow diagram 500 may begin at block 502 and continue to block 504.

In block 504, the APS 110 may communicate with the cache database module 316 to obtain one or more types of private information from the cache database 318.

In block 506, the APS 110 may generate one or more triggers events to protect the private information. The trigger module 304 of the APS 110 may process the private information at one or more of the modules 402-416 to generate one or more types of information. The trigger events may correspond to when the trigger module 304 determines that the user may be entering one or more characters of private information in response to an untrusted electronic document and that the APS 110 may need to perform further processing to determine whether to take further action to protect the private information against a possible phishing attack. The trigger events may identify that a user is entering private information before or after the user has input all of the characters of the private information.

In block 508, the APS 110 may monitor characters in the user input data stream of data input by the user at the user computer 102. The user input module 302 of the APS 110 may receive one or more characters that form a user input data stream of user input entered by the user at a keyboard and/or mouse of the user computer 102. The detection module 306 may monitor each character, such as, but not limited to, numbers, letters, symbols, movements, etc., input by the user at the user computer 102 in the user input data stream temporally and/or sequentially. The detection module 306 also may monitor characters copied into any fields of the untrusted electronic document from another file of the user computer 102.

In block 510, the detection module 306 may identify if one or more characters in the user input data stream correspond to one or more characters of the private information associated with a trigger event. For example, the trigger event may indicate that the APS 110 may perform further processing to verify the untrusted electronic document when three letters of a complex password are identified in the user input data stream.

In block 512, the action module 308 of the APS 110 may compare a communication address of the untrusted electronic document with a whitelist of trusted addresses for trusted electronic documents. A whitelist of trusted address may be a list of addresses of sources for electronic documents that the user indicates may be trusted. For example, the whitelist of trusted address may include addresses of non-phishing websites, trusted computers, trusted servers, and/or other trusted communication devices.

Initially, the whitelist may be empty. The whitelist may be populated by the user with addresses of trusted electronic documents as the user visits and adds addresses to the whitelist, as discussed below, or alternatively, the APS 110 may prompt the user to identify one or more addresses of trusted electronic documents to add to the whitelist. In a further alternative exemplary embodiment, a company, such as Google, may maintain a whitelist of trusted addresses for electronic documents that the APS 110 may download. If the address of the untrusted electronic document is on the whitelist, the flow diagram 500 may then continue to 518 and may permit the user to communicate the private information and any other information with the server 106. In other exemplary embodiments, the APS 110 may compare the address of the untrusted electronic document with the whitelist of addresses for trusted electronic documents before generating any trigger events. If the address of the untrusted electronic document is not on the whitelist, the flow diagram 500 may then continue to 514.

In block 514, the action module 308 of the APS 110 may take an action to protect the private information. In an exemplary embodiment, the action may be one or more of instructing the transmission module 314 to stop data transmission across the network 104, instructing the message module 310 to display a message to the user, authenticating the server 106, and/or other actions to protect the user's private information.

In an exemplary embodiment, the message may remind the user that the private information they have entered is currently associated with one or more other provider(s) (i.e., a trusted provider(s)), which may differ from the provider of the untrusted electronic document. The message also may display one or more links corresponding to trusted communication documents associated with the trusted providers from the whitelist. Also, the action module 308 may obtain a logo from a digital certificate of the trusted provider, and forward the logo to the message module 310. In an exemplary embodiment, the digital certificate may be a x.509 certification associated with the trusted website and/or provider. The message module 310 may display the logo in the message to visually remind the user with which trusted provider the private information is associated.

The message also may include various warnings based on the information used by the trigger module 304 to generate the trigger event. In an exemplary embodiment, the message may include one or more of private information, forwarding information, connection information, data transfer information, electronic content information, complexity information, format information, account information, alone or in combination, associated with the trigger event. For example, the message may indicate that the electronic content information indicates that the untrusted electronic document is soliciting private information associated with a trusted provider, but that the address of the untrusted electronic document does not correspond to the address of the trusted provider. In further examples, the message may warn the user anytime that the untrusted electronic document is not using a secured connection protocol, such as a non-SSL protected connection, to protect the private information.

Figure 6:
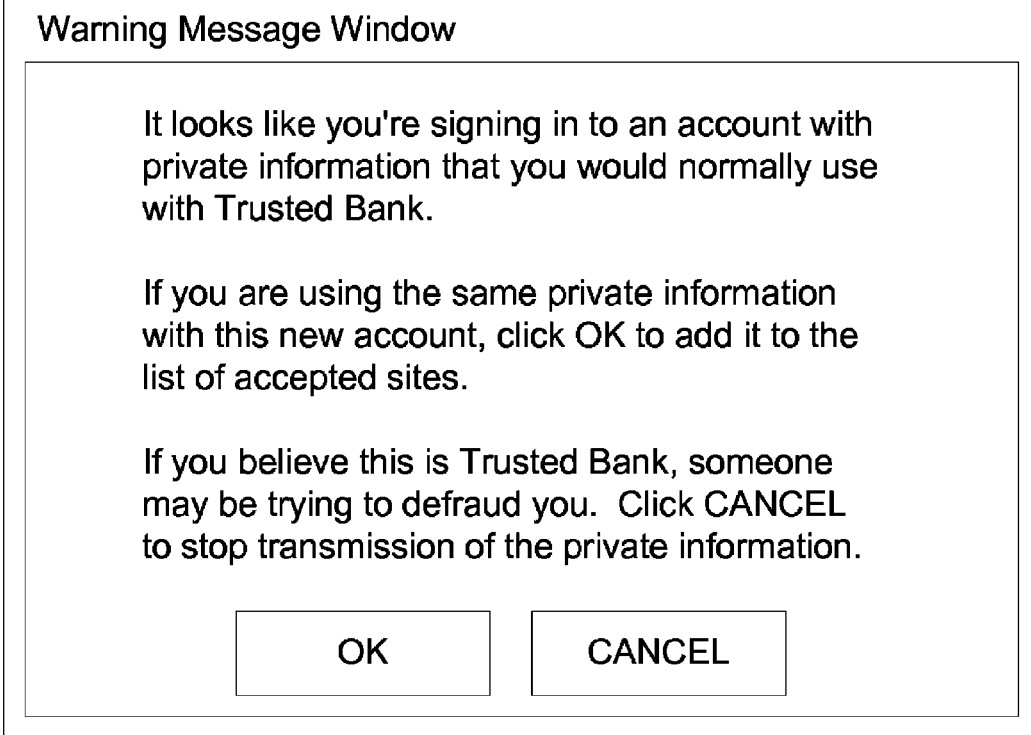
FIG. 6 illustrates an exemplary embodiment of a warning message window, in accordance with various embodiments of the invention.

FIG. 6 illustrates an exemplary embodiment of a warning message window 600. In the depicted exemplary embodiment, the message warning may state that:

It looks like you're signing in to an account with private information that you would normally use with Trusted Bank. If you are using this same information with this new account, click OK to add it to the list of accepted sites. If you believe this is Trusted Bank, someone may be trying to defraud you. Click CANCEL to stop transmission of the private information.

If the user clicks OK, the action module 308 may add the address of the untrusted electronic document to the whitelist and identify the untrusted electronic document as a new trusted website. The flow diagram 500 may then continue to block 518, where the APS 110 may permit the user to enter any information for transmission to the new trusted website and the flow diagram 500 may continue to block 520 and end.

In block 514, if the user selects not to add the untrusted electronic document to the whitelist, the action module 308 may instruct the transmission module 314 to stop and/or prevent transmission of any untransmitted private information in the user input data stream to the server 106. In other exemplary embodiments, the action module 308 may redirect the communication tool module 312 to a trusted provider, and/or also may automatically report or prompt the user to report the untrusted electronic document to a company that monitors phishing.

It is noted that the APS 110 may not perform all of the exemplary processes depicted in FIG. 3. In simplified exemplary embodiment, the APS 110 may compare the address of an untrusted electronic document with a whitelist of trusted addresses for electronic documents. If the APS 110 finds a match, then the APS 110 may permit the user to transmit any information with the server 106 of the electronic document. If the APS does not find a match, the APS 110 may monitor the characters entered by the user at the user computer 102, compare the characters with stored private information, determine that the user has entered some or all of the characters corresponding to one or more types of stored private information, and then take an action to protect the private information, such as displaying a message that the untrusted electronic document may be attempting to defraud the user. The user's response to the message may determine whether to permit further transmission of private information to the server 106.

Additional Examples

The following provides two examples of the APS 110 protecting a user's private information. In the first example, the private information may be a credit card number, and the trigger module 304 may generate a trigger event based on information received from the format information module 416. In this example, the format information module 416 may query the cache database 318 and may identify that the user has an account with Trusted bank. Based on ISO 7812, the format information module 416 indicates in the format information the BIN of Trusted bank (e.g., "3434"). The trigger module 304 receives the format information from the format information module 416 and generates a trigger event based on identifying "3434" in the user input data stream.

Using the communication tool module 312, the user may access the website www.trustedshoes.com from the server 106 and may input data for transmission to the server 106. The detection module 306 may monitor the user input data stream for the number string "3434." If the detection module 306 identifies "3434" in the user input data stream, the action module 308 may compare the address of the website (i.e., www.trustedshoes.com) with the whitelist of trusted addresses. In this example, the whitelist may not include www.trustedshoes.com. The action module 308 may then instruct the transmission module 314 to stop transmission of data to the server 106, may authenticate the server 106 to confirm that the server 106 is associated with the provider (i.e., Trusted Shoes), and may instruct the message module 310 to display a message to the user at the user computer 102. The message may state that: "It appears that you're entering your credit card number at www.trustedshoes.com. We have confirmed that this website corresponds to Trusted Shoes. Click OK to add their website to the list of trusted websites. If you believe this is someone other than Trusted Shoes, someone may be attempting to defraud you. Click CANCEL to end this transmission." Based on the user's selection, the APS 110 may permit the user to enter their credit card number or may end the transmission.

In the second example, the private information may be a username and password, and the trigger module 304 may generate a trigger event based on information received from the complexity information module 410. In this example, the complexity information module 410 may query the cache database 318 and may identify that the private information of the user is a username and password that are both common dictionary words associated with www.trustedbank.com. For example, the username may be "bob" and the password may be "cat." The trigger module 304 may generate a trigger event for identifying when portions of both of the username and password appear near to one another temporally and/or sequentially in the user input data stream. For example, the trigger event may correspond to identifying "bob" and "ca" or "bo" and "cat" within 50 characters of one another within the user input data stream.

Using the communication tool module 312, the user may receive an email from "youraccount@trunstedbank.com," which redirects the user to the website www.trunstedbank.com and is associated with the server 106. The detection module 306 may monitor the user input data stream for "bob" and "ca" or "bo" and "cat" within 50 characters of one another. If the detection module 306 identifies either in the user input data stream, the action module 308 may compare the address of the website (i.e., www.trunstedbank.com) with the whitelist of trusted addresses. In this example, the whitelist does not include www.trunstedbank.com because of the misspelling of the word "trusted." The action module 308 may then instruct the transmission module 314 to stop transmission of the user input data stream to the server 106, may attempt to authenticate the server 106 to confirm that the server 106 is associated with the provider (i.e., Trusted Bank), and may instruct the message module 310 to display a message to the user at the user computer 102. The message may state that: "It appears that you're entering your username and password at www.trunstedshoes.com. We have not been able to confirm that this website is associated with Trusted Bank. If you believe that this website is from Trusted Bank, someone may be attempting to defraud you. Click CANCEL to end this transmission. Click OK to add this website to the list of trusted websites." Based on the user's selection, the APS 110 may permit the user to enter their username and password or may end the transmission.

Thus, the above exemplary embodiments of the APS 110 may provide users with protection against phishing attacks based on the types of private information phishers are attempting to retrieve.

The exemplary embodiments of the present invention are not to be limited in scope by the specific embodiments described herein. For example, although many of the embodiments disclosed herein have been described with reference to anti-phishing systems, particularly with reference to websites, the principles herein are equally applicable to protecting users from other types of electronic document displays other than websites which attempt to fraudulently obtain private information from the user. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A method comprising:
   at a user's computing device at which the user enters a user input data stream, the computing device having one or more processors:

identifying, from the user input data stream, a first set of one or more characters, wherein the first set of one or more characters represents a portion of first private information;

identifying, from the user input data stream, a second set of one or more characters, wherein the second set of one or more characters represents a portion of second private information and the second set of one or more characters is subsequent to the first set of one or more characters in the user input data stream;

determining whether a respective remote server is on a whitelist; and in accordance with a determination that the respective remote server is not on a whitelist and that the first set of characters and second set of characters are identified in accordance with a predefined sequential relationship, taking a protective action at the user's computing device, prior to transmitting at least a subset of the characters of the first or second private information from the user's computing device to the respective remote server, remotely located from the user's computing device, to protect the first or second private information, wherein taking the protective action includes stopping transmission of the subset of the characters from the user input data stream to the remote server.

2. The method of claim 1, wherein the first private information includes a username, and the second private information includes a password corresponding to the username.

3. The method of claim 1, wherein the sequential relationship includes a predefined maximum number of characters between the first set of characters representing the first private information, and the second set of characters representing the second private information.

4. The method of claim 1, further comprising: generating a trigger event, and wherein the identification of the first set or second set of characters is in response to the trigger event.

5. The method of claim 4, wherein the trigger event is generated based at least in part on one of: forwarding information, connection information module, electronic content information, complexity information, data transfer information, account information, or format information module.

6. The method of claim 1, wherein taking the protective action includes one of: authenticating the remote server, stopping transmitting the subset of the characters to the remote server, or displaying a warning message.

7. The method of claim 1, wherein taking the protective action occurs before the user inputs all characters of the first and second private information.

8. A system, comprising a user's computing device at which the user enters a user input data stream, the user's computing device comprising:
one or more processors;
memory; and
one or more programs, wherein the one or more programs are stored in the memory and configured to be executed by the one or more processors, the one or more programs including instructions for:
identifying, from a user input data stream, a first set of one or more characters, wherein the first set of one or more characters represents a portion of first private information;
identifying, from the user input data stream, a second set of one or more characters, wherein the second set of one or more characters represents a portion of second private information and the second set of one or more characters is subsequent to the first set of one or more characters in the user input data stream;

determining whether a respective remote server is on a whitelist; and in accordance with a determination that the respective remote server is not on a whitelist and that the first set of characters and second set of characters are identified in accordance with a predefined sequential relationship, in accordance with a determination that the first set of characters and second set of characters are identified in accordance with a predefined sequential relationship, taking a protective action at the user's computing device, prior to transmitting at least a subset of the characters of the first or second private information from the user's computing device to the respective remote server remotely located from the user's computing device, to protect the first or second private information, wherein taking the protective action includes stopping transmission of the subset of the characters from the user input data stream to the remote server.

9. The system of claim 8, wherein the first private information includes a username, the second private information includes a password corresponding to the username.

10. The system of claim 8, wherein the sequential relationship includes a predefined maximum number of characters between the first set of characters representing the first private information, and the second set of characters representing the second private information.

11. The system of claim 8, wherein the one or more programs further comprising instructions for: generating a trigger event, and wherein the identification of the first set or second set of characters is in response to the trigger event.

12. The system of claim 11, wherein the trigger event is generated based at least in part on one of: forwarding information, connection information module, electronic content information, complexity information, data transfer information, account information, or format information module.

13. The system of claim 8, wherein taking the protective action includes one of: authenticating the remote server, stopping transmitting the subset of the characters to the remote server, or displaying a warning message.

14. The system of claim 8, wherein taking the protective action occurs before the user inputs all characters of the first and second private information.

15. A non-transitory computer readable storage medium storing one or more programs on a user's computing device at which the user enters a user input data stream, the one or more programs comprising instructions, which when executed by a system with one or more processors, cause the system to:
identify, from the user input data stream, a first set of one or more characters, wherein the first set of one or more characters represents a portion of first private information;
identify, from the user input data stream, a second set of one or more characters, wherein the second set of one or more characters represents a portion of second private information and the second set of one or more characters is subsequent to the first set of one or more characters in the user input data stream;
determine whether a respective remote server is on a whitelist; and
in accordance with a determination that the respective remote server is not on a whitelist and that the first set of characters and second set of characters are identified in accordance with a predefined sequential relationship, take a protective action at the user's computing device, prior to transmitting at least a subset of the characters of the first or second private information from the user's computing device to the respective remote server remotely located from the user's computing device, to protect the first or second private information, wherein taking the protective action includes stopping transmission of the subset of the characters from the user input data stream to the remote server.

16. The non-transitory computer readable storage medium of claim 15, wherein the first private information includes a username, the second private information includes a password corresponding to the username.

17. The non-transitory computer readable storage medium of claim 15, wherein the sequential relationship includes a predefined maximum number of characters between the first set of characters representing the first private information, and the second set of characters representing the second private information.

18. The non-transitory computer readable storage medium of claim 15, the one or more programs further comprising instructions, when executed, cause the system to:

generate a trigger event, and wherein the identification of the first set or second set of characters is in response to the trigger event.

19. The non-transitory computer readable storage medium of claim 18, wherein the trigger event is generated based at least in part on one of: forwarding information, connection information module, electronic content information, complexity information, data transfer information, account information, or format information module.

20. The non-transitory computer readable storage medium of claim 15, wherein taking the protective action includes one of: authenticating the remote server, stopping transmitting the subset of the characters to the remote server, or displaying a warning message.

21. The non-transitory computer readable storage medium of claim 15, wherein taking the protective action occurs before the user inputs all characters of the first and second private information.

* * * * *